(12) United States Patent
Gill

(10) Patent No.: US 7,036,850 B2
(45) Date of Patent: May 2, 2006

(54) PIPE COUPLING

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 121 days.

(21) Appl. No.: 10/654,666

(22) Filed: Sep. 4, 2003

(65) Prior Publication Data

US 2005/0052021 A1   Mar. 10, 2005

(51) Int. Cl.
*F16L 37/00* (2006.01)
(52) U.S. Cl. ................... 285/314; 285/320; 285/308
(58) Field of Classification Search ............... 285/314, 285/320, 308
See application file for complete search history.

(56) References Cited

U.S. PATENT DOCUMENTS

| | | | |
|---|---|---|---|
| 37,721 A * | 2/1863 | Jucket ........................ 285/314 |
| 114,575 A * | 5/1871 | Lovell ........................ 285/314 |
| 464,386 A * | 12/1891 | Patterson .................... 285/314 |
| 527,764 A | 10/1894 | Bichet et al. |
| 558,364 A * | 4/1896 | Doolittle .................... 285/283 |
| 592,899 A | 11/1897 | Wilson |
| 969,019 A * | 8/1910 | Wilson et al. .............. 285/311 |
| 1,029,819 A | 6/1912 | Nylander |
| 1,996,287 A * | 4/1935 | Fisher .......................... 285/5 |
| 2,102,774 A | 12/1937 | Williams |
| 2,493,577 A | 1/1950 | Franklin |
| 3,104,896 A * | 9/1963 | Kennedy, Jr. ................ 285/18 |
| 3,345,087 A | 10/1967 | Hanes et al. |
| 3,827,728 A | 8/1974 | Hynes |
| 5,149,143 A | 9/1992 | Howell |
| 5,387,017 A * | 2/1995 | Gill ........................... 285/322 |
| 5,586,789 A * | 12/1996 | Bently ......................... 285/38 |
| 5,707,340 A | 1/1998 | Hipp et al. |
| 5,752,724 A * | 5/1998 | Bormioli ..................... 285/18 |
| 5,794,988 A | 8/1998 | Gill |
| 5,868,441 A * | 2/1999 | Gill ........................... 285/322 |

\* cited by examiner

*Primary Examiner*—Eric K. Nicholson
(74) *Attorney, Agent, or Firm*—Mallinckrodt & Mallinckrodt

(57) ABSTRACT

A coupling to connect pipe, including lengths of pipe, valves, hoses, and pipe and hose fittings, includes a body to closely receive the end portion of the pipe to be coupled. A set of first class lever jaw members each having a power arm and a weight arm are mounted to the coupling body to establish a fulcrum for rotation of each lever jaw member about the fulcrum between an engaged position and a disengaged position with respect to the pipe end portion when received in the coupling body. The weight arms may include a gripping surface such as a rubber or plastic material or gripping teeth to grip a smooth end portion of a pipe, or the end portion of the pipe may include a shoulder, such as formed by a groove in the end portion, so the weight arms engage the shoulder to secure the pipe in the coupling. The coupling may have lever arms at each end to similarly attach to end sections of pipe to join them in end to end manner, or the coupling may be otherwise secured to one end of a pipe with the lever jaw members attaching the coupling to another pipe.

27 Claims, 9 Drawing Sheets

PIPE COUPLING

BACKGROUND OF THE INVENTION

1. Field

Figure 1:
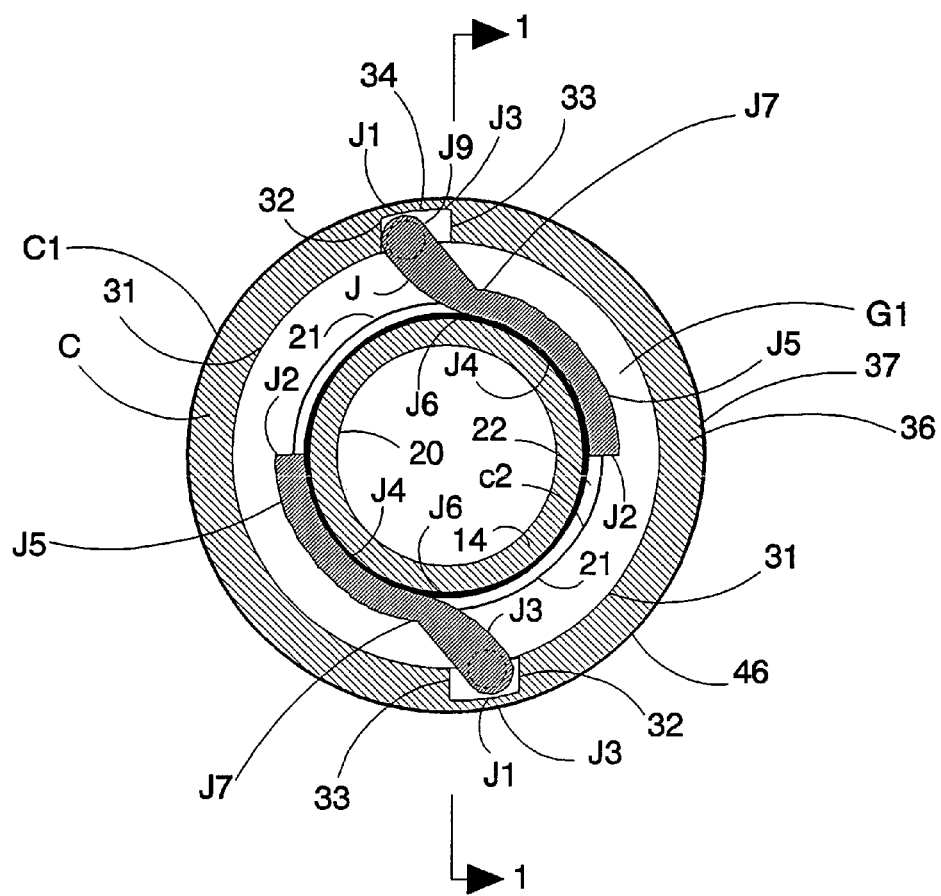

The invention is in the field of couplings to connect grooved or plain end portions of pipes, and to connect hoses valves, pipe fittings, expansion joints, and dead ends of pressure vessels.

2. State of the Art

There are various types of mechanical couplings which employ various radial mechanical means, such as clamps and rings to secure the couplings to circumferential grooves on the ends of two pipes being connected. There are also my couplings, patented under U.S. Pat. Nos. 5,387,017 and 5,868,441, each of which employ a set of camming jaw members mounted on the coupling body around the receiving opening, where, to engage or to disengage, the coupling jaw members move toward or away from a pipe received in the body. There are other U.S. Pat. Nos. 5,794,988 and 6,186,560 by the inventor where expandable rings are employed to engage or to disengage the coupling. The new invented coupling is more economical to produce, and is easier than other couplings to connect plain end pipe. From here on the word pipe will encompass not only lengths of pipe, but also valves, hoses, and pipe and hose fittings where a connection is made to a pipe or other hoses or fittings.

SUMMARY OF INVENTION

According to the invention, a coupling to connect two opposite circumferential end portions of pipe includes a coupling body with a receiving opening therein so that the coupling body closely receives and surrounds the end portion of a pipe to be coupled. A set of rigid lever jaw members is mounted inside a radial groove concentric with the axis of the coupling and constructed inside the coupling body in the end portion of the coupling. The set of lever jaw members may consist of only one lever jaw member or of more than one lever jaw member. The lever jaw members each define a first class lever. A first class lever has the fulcrum between the effort (the power arm of the lever) and the load (the weight arm of the lever). Thus, a separate power arm of the lever extends from the fulcrum of the lever and a separate weight arm extends from the fulcrum of the lever. By separate arms is meant that the power arm and weight arms are separate arms, although they may be formed by a single length of material with the fulcrum dividing the length of material into the power arm and the weight arm where the two arms have a common portion surrounding the fulcrum. In a preferred embodiment of the invention, the power arm of each lever is offset from the weight arm of the lever by an axle which forms the fulcrum of the lever. The words fulcrum and an axle will be considered as synonyms when describing the preferred embodiment. A portion of the weight arm furthest away from the fulcrum is arcuate, preferably concentric with a groove in the body of the coupling which accommodates it, which also makes it concentric with the end portion of a pipe to be coupled received in the coupling body receiving opening. The fulcrum axle at the junction of the power and weight arms is located in a gap or opening provided in the end of the coupling where the radial groove is interrupted with an opening from the radial groove to outside the coupling body. In the preferred embodiment, the power arm is situated outside the coupling body and runs approximately parallel to the weight arm situated inside the coupling body.

The power arm of the lever jaw can be operated on by a hand or hand held tool. Rotating the power arm in one direction moves the weight arm toward a pipe end portion received in the coupling body receiving opening, and rotating the power arm in the opposite direction moves the weight arm away from the pipe. The power arm is kept rotatably attached to the outer face body of the coupling body. Thus, the weight arm is engaged or disengaged with a pipe received in the coupling body receiving opening (the pipe having a plain surface or a groove in its end portion) by rotating the lever jaw about its fulcrum, using the power arm of the lever jaw. Each weight arm is locked in engaged position with the pipe by means of radial bolts passing through the end portion of the body of the coupling. The radial groove inside the end portion of the body of the coupling is provided with sufficient depth to accommodate the movement of the lever arm.

It may be necessary or unnecessary to employ locking bolts with the coupling when used with grooved or plain end pipe. With the grooved pipe, the end of the power arm outside the coupling body, situated against the outer face of the coupling, may be locked by a frictional fit. Friction may be provided in various ways for a friction fit.

For different applications of the coupling, different types of gaskets are provided between the coupling and pipe end portions. In some application conventional "O" rings or other gaskets may be used with the coupling. At least one gasket is provided for the coupling to seal the exit of fluid from the pipes being joined. A predetermined length of gap between the ends of two pipes being joined may be provided for thermal expansion and to maintain the integrity of the gasket seal.

Also, according to the invention, a coupling for connecting to the end portion of a pipe includes a coupling body with a receiving opening therein so that the coupling body closely receives and surrounds the end portion of a pipe to be coupled. The coupling has an inner end taper and a set of jaw members slidably positioned in the inner end taper of the coupling body so that linear movement of the jaw members toward the end of the inner end taper causes movement of the jaw members radially inwardly of the coupling body against the end portion of the pipe when received in the coupling body. Linear movement of the jaw members in the opposite direction causes radial movement of the jaw members away from the received pipe to release the pipe from the coupling. Means, such as laterally extending slots through the inner end taper of the coupling body with bolts extending from the jaw members slidably through the slots, secure the jaw members to the coupling body. The inner end taper with accompanying jaw members can be provided in one end of the coupling or may be provided in both ends of the coupling.

THE DRAWINGS

Figure 2:
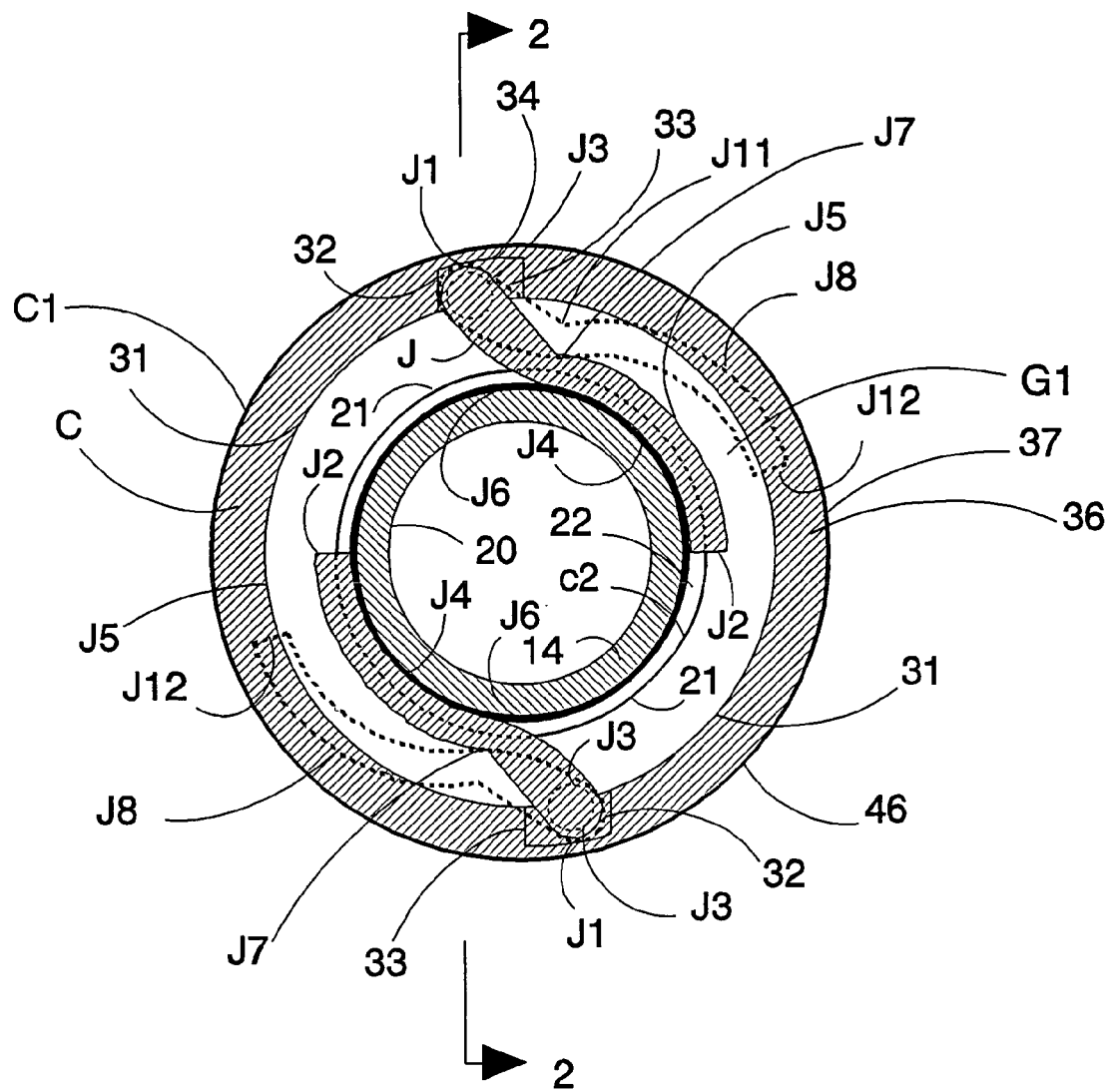
Figure 3:
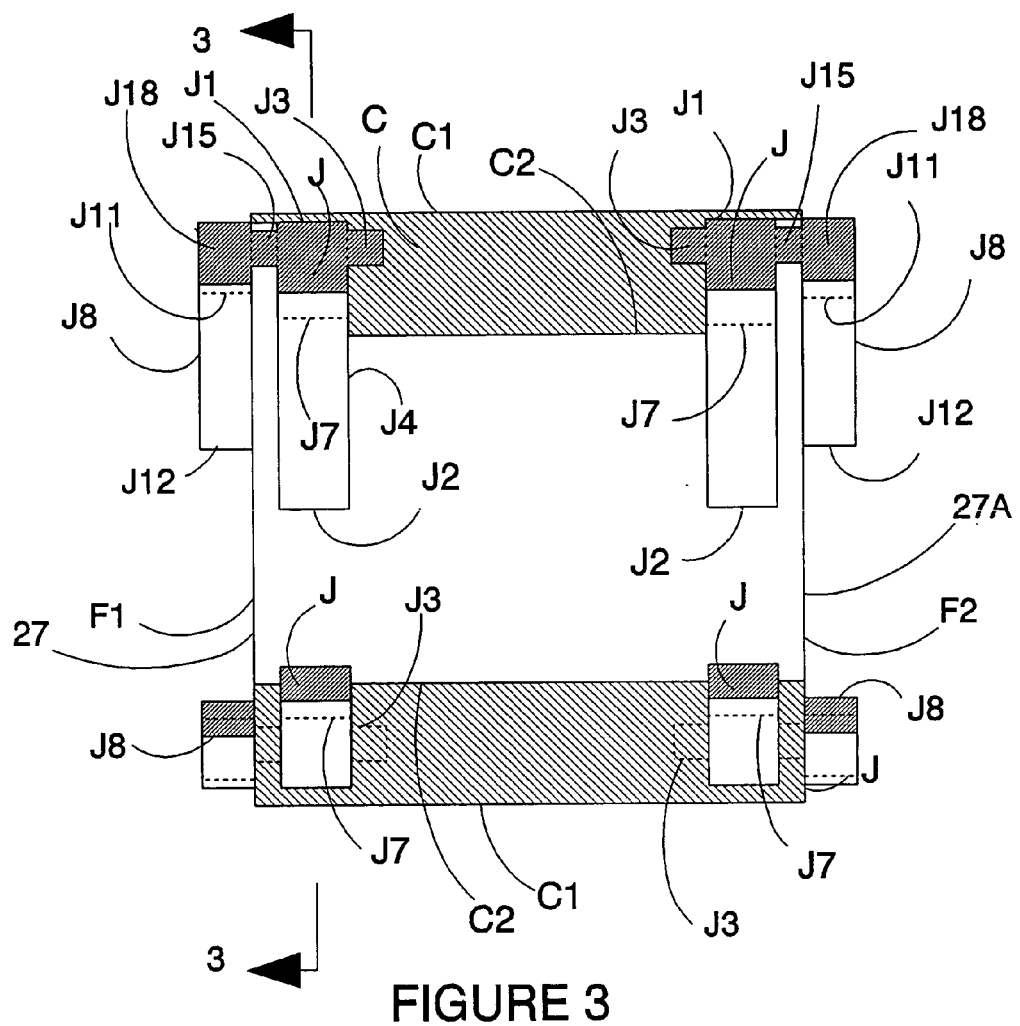
Figure 4:
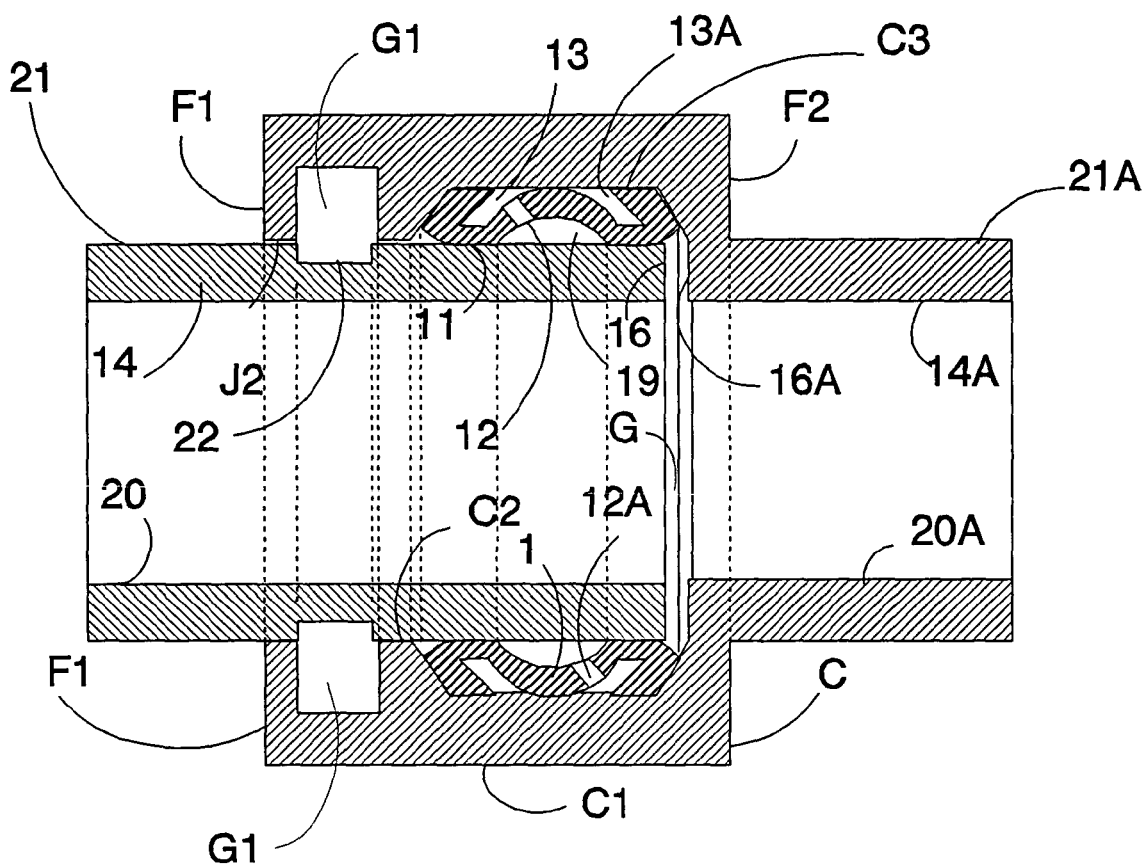
Figure 5:
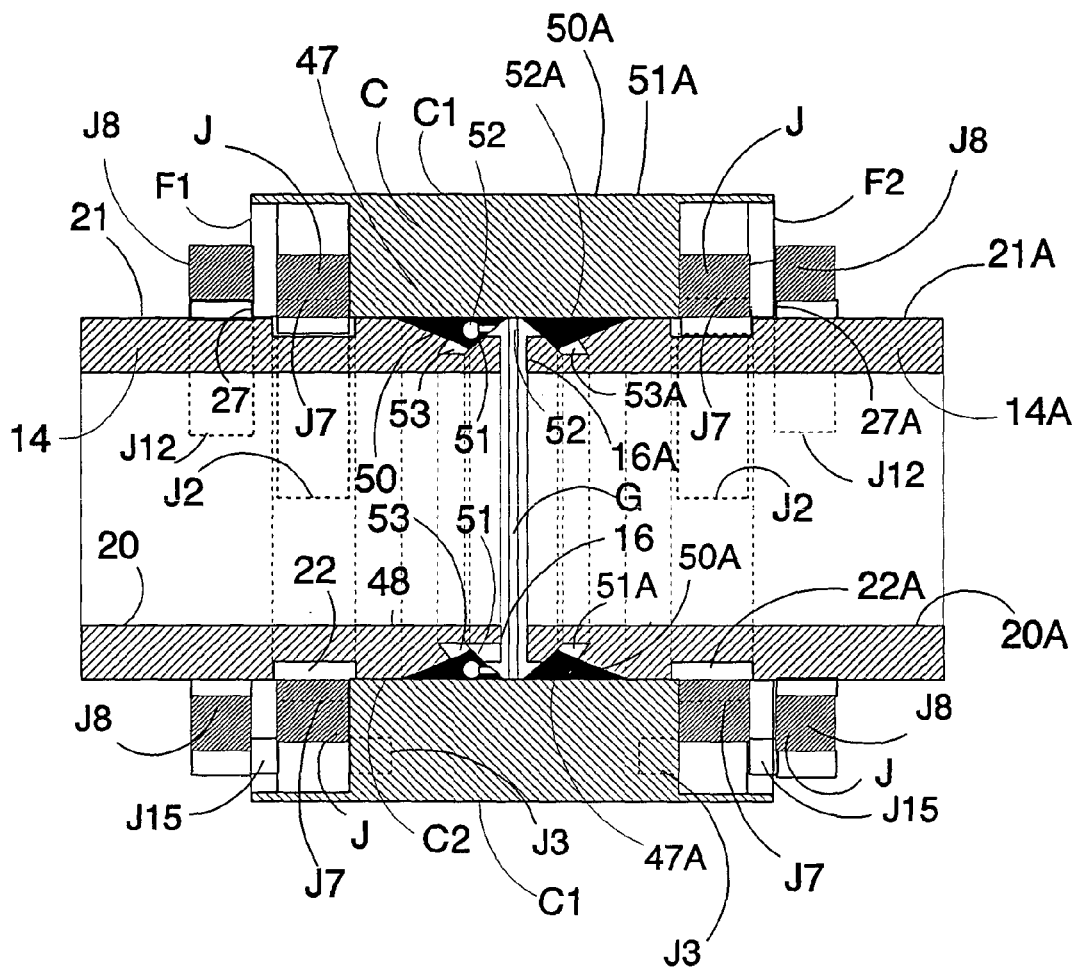
Figure 6:
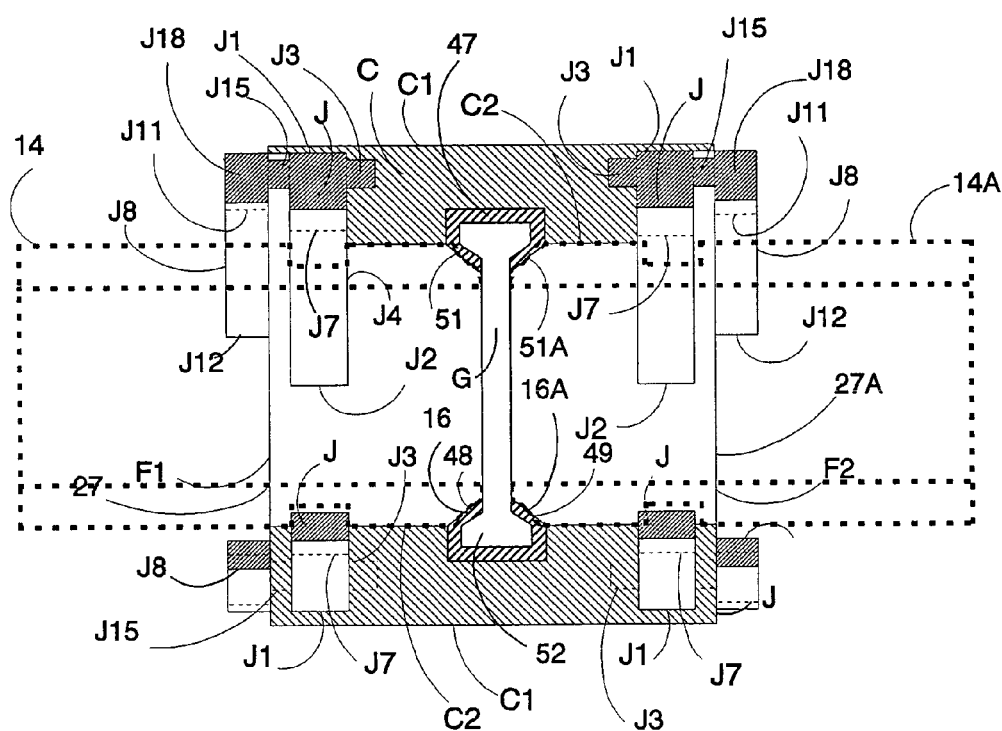
Figure 7:
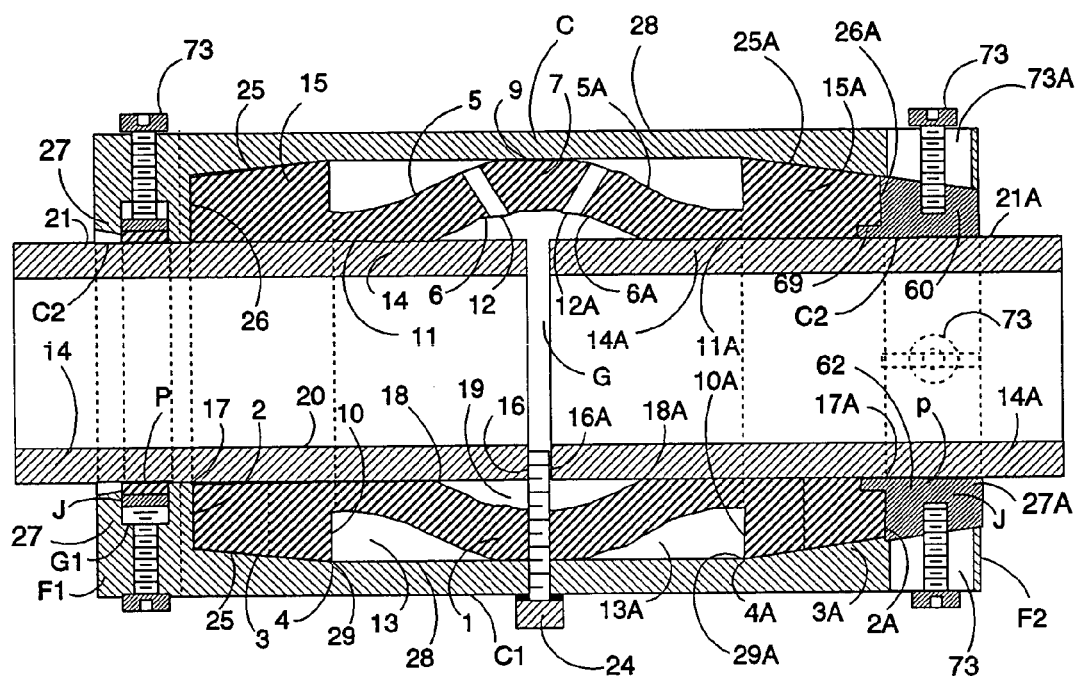
Figure 8:
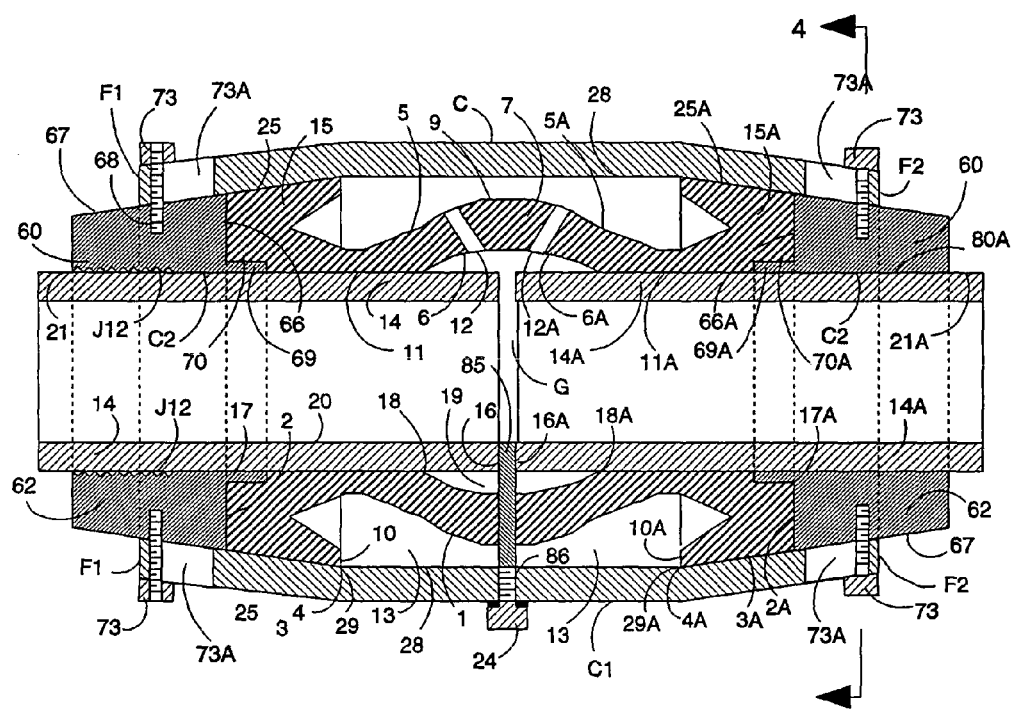
Figure 9:
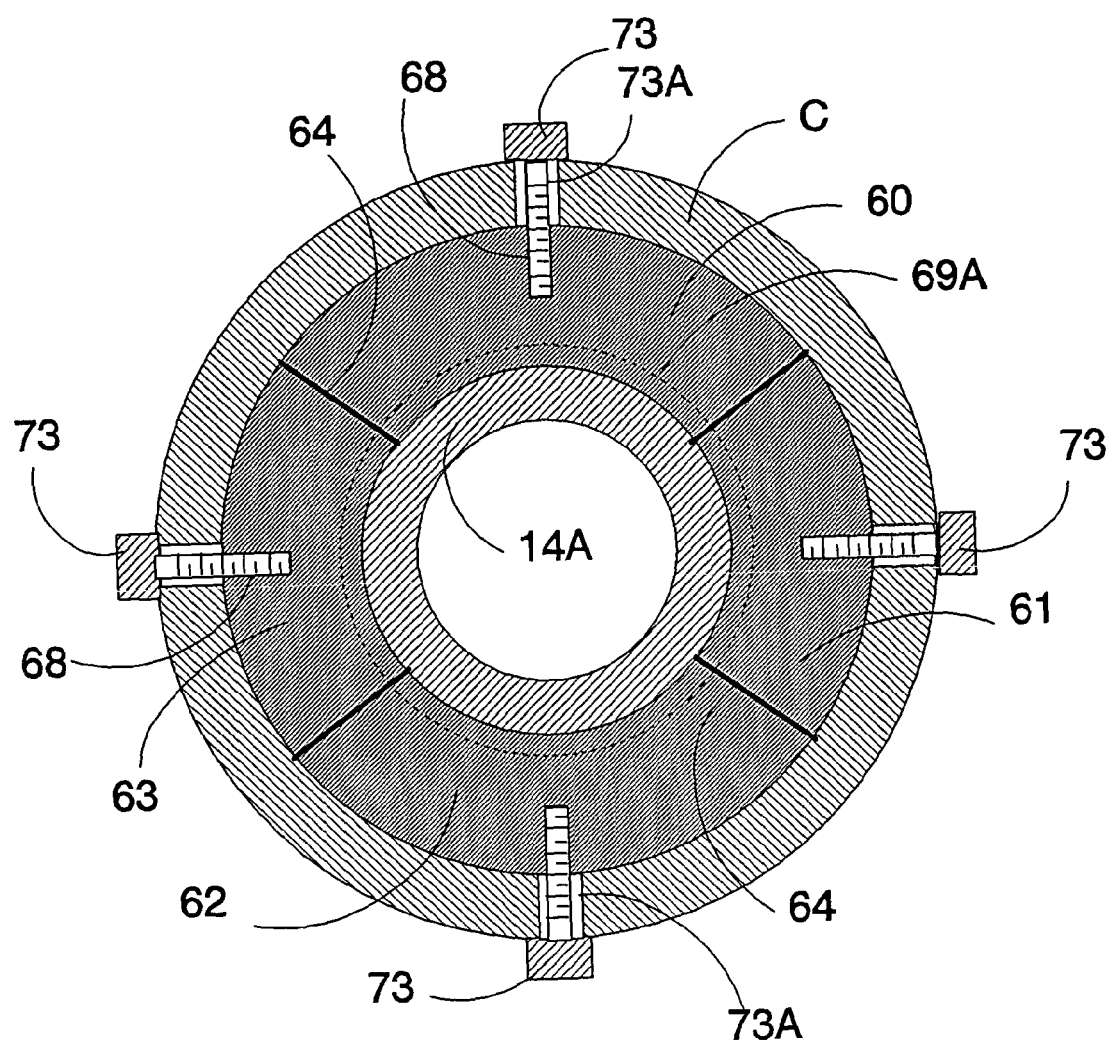

The best mode presently contemplated for carrying out the invention is illustrated in the accompanying drawings, in which:

FIG. 1 is a transverse vertical section of the coupling of the invention taken through the lever jaws in engaged and locked position with the groove of a pipe to be coupled;

FIG. 2, a section similar to that of FIG. 1, taken on line 3—3 of FIG. 3, where relative positions of weight and power arms with respect to one another are shown;

FIG. 3, a longitudinal vertical section taken on line 2—2 of FIG. 2. where pipes are not shown, but only the coupling is depicted;

FIG. 4, a longitudinal vertical section of a bell type coupling of FIG. 1, where lever jaws are not show, only a diaphragm seal is depicted;

FIG. 5, a longitudinal vertical section of a two ended coupling of FIG. 1 taken on the line 1—1 of FIG. 1 showing two triangular type seals; and FIG. 6, a longitudinal vertical section of a two ended coupling with inverted deformed "U" type seal, mounted on two rings with slanted faces where the rings are welded to pipe end portions FIG. 7, a longitudinal vertical section of a coupling taken on the line 1—1 of FIG. 1, where a long and heavier diaphragm seal is used for hydraulic grip, where one end of couplings is fitted with removable griping jaws to facilitate the mounting of a heavier diaphragm seal;

FIG. 8, a section similar to that of FIG. 7, but showing the coupling provided with removable griping jaws on both ends of the coupling; and FIG. 9, a vertical section taken on the line 4—4 of FIG. 8.

DETAILED DESCRIPTION OF THE ILLUSTRATED EMBODIMENT

All the drawings can be studied together. Whether the coupling is one ended (having inner groove G1 and lever jaw members J only in one end portion of the coupling body with invented means to couple pipe) or two ended (where the coupling has inner grooves G1 and G2 and lever jaw members J in both end portions of the coupling body with invented means to couple pipe) the mechanical means, such as the lever jaw members which are employed to engage the coupling with the pipe, remains the same. For different requirements, and for cost effectiveness, different types of gaskets are shown in the drawings. Therefore, more than one type of gasket may be depicted on any given pipe section illustration. It is pointed out that drawings are not to any particular scale. It is further pointed out that because of the simplicity of the drawings, if any element (such as a lever jaw or the bolt used to lock the lever jaw in place) is used more than once in the design, that element will be depicted by the same numbers and alphabets in the same drawing and in all other drawings as well.

First, the coupling for grooved end pipe, FIGS. 1 to 6, will be explained simultaneously. FIGS. 1 and 2 are the same, except that FIG. 2 shows a reverse view, and it shows relative position of weight and power arms with respect to each other. As shown in FIG. 1, the coupling has body C with outer diameter C1 and inner diameter C2. The depth of the inner groove G1, which is used to accommodate lever jaws J, is depicted by the height between inner diameters C2 of the coupling body and groove diameter 31. The coupling C is shown to engage pipe 14 with inner and outer diameters 20 and 21 respectively. The two ends of lever J are shown by J1 and J2. Concentric with the coupling, an arcuate portion J4, of lever jaw J, is delineated by J2, J6 and J7. J4 is concentric with the coupling body, with the pipe, with the inner groove in the body of the coupling, and with the groove in the outer surface of the pipe. The section between J7 and J9 diverges from said arcuate section J4, by making an interior angle at J7 with J4, outward and away from the center of the coupling to the fulcrum an integral axle J3 of the lever jaw. The power arm J8 shown in FIGS. 2, 3, 5 and 6 between J3 and J12, exits out of the coupling by making an offset interior angle with the weight arm at J9. The weight arm J5 and the power arm J8 are kept apart by means of circular stem J15 shown in FIG. 3. The power arm J5 preferably is a replica of the weight arm J8. The section of the power arm between J11 and J18 (shown in FIG. 3) diverges from the arcuate section J8 by making an interior angle at J11 with J8. Lever jaw J is held in position to coupling body C by means of a fulcrum integral axle J3, located in a cut delineated by 32, 33, and 34, where groove G1 is also interrupted. The power arm J8, between J3 and J12, rotates the weight arm from J3 to J2, about the fulcrum J3. The portion of lever jaw J4, between J2 and J6, is designed to engage the groove of the pipe. The groove on the end portion of the pipe is indicated by 22.

Optional radial bolts may be provided to secure the unlocking of the power arms j8, but the power arms locked in place by friction fit against the outer faces F1 and F2 of the coupling body. In low pressure pipes or hoses where frequent engaging and disengaging of the coupling is required, only one lever jaw J will be provided in the coupling. It is further pointed out that if high pressure in the pipe line requires the use of more than one or two lever jaws, then more than one or two lever jaws J will be provided for the coupling. The two pipes being connected in the Figures are shown by 14 and 14A; their outer diameters are depicted by 21 and 21A.

The mechanical means of lever jaw J has already been explained under FIGS. 1, 2, and 3. Therefore, they will not be discussed again unless the need arises, and only new elements in each Figure will be explained. In all of the drawings, the body of each coupling is shown by C, its outer diameter is shown by C1, and its inner diameter by C2. The length of each coupling between its outer opposite ends, is indicated by F1 and F2. Outer faces F1 and F2 also provide the outer walls 27 and 27A for grooves G1 and G2 respectively.

FIGS. 3 and 5 and 6 show two a ended couplings, and FIG. 4 shows a one ended coupling. In FIG. 4 the one ended coupling is integrated either with a traditional pipe or with a hose shank. Whichever the case, the pipe or hose shank is shown by 14A.

To make coupling easily understood, the coupling in FIG. 3 is shown without any pipe. It depicts a longitudinal vertical section taken on line 2—2 of FIG. 2. All the elements of FIG. 3 have been discussed with FIGS. 1 and 2.

FIG. 4 employs a diaphragm type of gasket seal. Seal 1 is provided with openings 12 and 12A to pressurize the seal with fluid in the pipe line. The outer surface 21 of pipe 14 provides a seat for gasket 1. Through cavity 19 and openings 12 and 12A, fluid reaches internal cavities 13 and 13A, and pressurizes diaphragm seal 1, thus blocking the exit of fluid between 14 and 11. The lever jaws with their wight and power arms are not shown in FIG. 4. FIG. 4 shows clearly groove G1 for the lever Jaw weight arm, and the groove 22 constructed in the ring welded to the pipe or around the pipe.

In FIG. 5 shows invented coupling holding two pipes 14 and 14A together. It also shows two seal gaskets mounted over rings, which rings may be welded to the ends of the pipes or mounted around the end portions of pipes. The power arms J8 are held in place against the end faces F1 and F2 by means of frictional fit or by means of frictional depression provided in said faces F1 and F2. The triangular seals 47 and 47A depicted by their sides 50, 51, 52 and 50A, 51A, 52A respectively are mounted in corresponding triangular grooves. The seal may be a solid seal or it may be provided hollow interior which can be energized by the fluid in the pipe line. The fluid in cavities 53 and 53A uotward toward the coupling body and the fluid provided by the gap G pushed the seals outward parallel to the axis of the pipe. Thus the resultant force is such that it seals the fluidl. The power jaws J8 (shown in FIG. 2) can be pried out by pushing a tool between the arm J8 and pipe.

The coupling shown in the FIG. 6 is the same coupling as shown in FIG. 3. The dotted pipes 14 and 14A are merely indicative pipes which coupling would hold together. In FIG. 6 during the push of the two pipes 14 and 14A the original "U" type of gasket 47 is deformed. The seal 47 is partially located in the inner coupling body and partially between the opposite ends of pipes between slanting ends 16 and 16A. In FIG. 6, gasket seal 47 is located in the corresponding cavity 52 created by the pipes 14 and 14A and the coupling C. The two arms of 47 are shown by 48 and 49. Fluid enters cavity 52, through gap G between pipes, and pressurizes the gasket. The original flare of the gasket, between arms 48 and 49, is reduced by slants 51 and 51A, when the pipes are pushed into the receiving openings of the coupling, during mounting.

Now FIGS. 7, 8, and 9 will be discussed together. The diaphragm gasket seal 1, as shown in FIG. 4, is slightly modified by providing inclines 3 and 3A in the outer surface of the diaphragm, rather than in the back of the diaphragm. The diaphragm seal is the same in FIGS. 7 and 8. The coupling in FIG. 7 is provided with at least one lever jaw 7 (shown in FIGS. previously discussed) on one side of the coupling; the other side of the coupling is provided with preferably a set of four jaws (where two jaws of the set are indicated by 60 and 62) held slidably inside the coupling body by means of slants depicted by 60A and 62A of jaws 60 and 62. The incline 3A is extended clearly to the outer face F2 of the coupling body to make it easier to mount the heavier diaphragm seal 1 inside the coupling body, particularly it is needed in the case of small size couplings. Opposite at the center of each of the jaws depicted by 60 and 62, a linear radial opening or slot for the travel of bolts 73 is provided. Each jaw is provided an extension 69 fitted under 15A. The expanding push of the jaws shown by 60 and 62 enlarge the diameter of 15A, and by tightening the bolts 73, the jaws are locked in place with the expanded diameter of said jaws, which further eases the mounting of the pipe 14A. In small size pipes where the diametrical tolerances are tight the mounting of the pipes in the coupling is not much of a problem, but in large size pipes where the range of tolerances are wider, it does create a problem in mounting of the pipe in a cylindrical coupling. Therefore, to over come this difficulty, the embodiment of FIG. 8 provides a coupling where jaws of type 60 and 62 are provided on both ends of the coupling body. The coupling C provides a cavity 19 in conjunction with pipes 14 and 14A for diaphragm gasket seal 1. The cavity is delineated by inner surfaces 28, 25, 26, 25A and 26A in the coupling body, and end portions of pipes 14 and 14a. Except for the pipes 14 and 14A, gasket 1 is delineated by numbers from 1 to 15. The two ends 2 and 2A of gasket 1 are abutted against two sides 26 and 26A of cavity 19. The end portions of the gasket with the inclines 3 and 3A are depicted by 15 and 15A. Fluid enters the diaphragm gasket seal through the gap G, between the ends 16 and 16A of pipes 14 and 14A, and then reaches inner cavities 13 and 13A through openings 12 and 12A. The fluid simultaneously pressurizes the entire diaphragm seal, including portions 11 between 17 and 18, and portion 11A between 17A and 18A, with 11 and 11A being positioned around 14 and 14A respectively. Thus the exit of the fluid, between pipe 14 and gasket portion 11, and pipe 14A and gasket portion 11A, is blocked. Openings 12 and 12A are located in the section between 6 and 6A, away from the ends 16 and 16A of 14 and 14A. Under fluid pressure, ends 15 and 15A are squeezed by the components of pressure force, and create hydraulic grips, which become complementary force to help lever jaws J to hold the pipes in place. Thus, plain ended pipe can be connected by the coupling of this invention. The interior section between faces 10 and 10A of gasket 1 makes a bell type curve indicated by curves 5, 7 and 5A, where the bell accommodates the designed deflection of the pipe. The length of each of the sections 11 and 11A of the diaphragm, in contact with the pipes, is preferably kept equal to half of the outside radius of the pipe, which is equated against the pressure acting against the shut off valve. At the time of mounting of diaphragm gasket seal 1 around the pipe, the angular section of gasket shown rising from the pipe's surface is some what stretched in its diameter and the rest portion of the diaphragm running toward the end of the coupling body merely hugs the surface of the pipe. Till the diaphragm is pressurized by the fluid, opposite angular portions of the bell section of the gasket nearest to the pipes and ends 15 and 15A of diaphragm 1 block the exit of the fluid from the pipe line.

Lever jaws J in FIG. 7 where plain or smooth pipe ends are coupled are preferably provided with gripping surfaces on the arcuate portions which contact the surface of the pipe end portion to be coupled. Such gripping surfaces may be provided by rubber material shown by ring P or by plastic or abrasive material to provide frictional contact with the pipe. By receding the bolts B away from J4, and by lifting the weight arms J4, pipe 14 is pushed into the receiving opening of the coupling, then the second pipe 14A is pushed into the second receiving openings of the coupling, and bolts 73 are tightened before the pipe line is pressurized by the fluid. The optional bolt 24 keeps the coupling fixed between the end 16 and 16A of pipes 14 and 14A. The rest of the coupling is explained previously.

In FIG. 8, jaws depicted by 60 and 62 may be provided with teeth J12 to provide the gripping surface to grip the pipe or they may be provided with rough surface. The teeth may be parallel to the axis of the pipe or concentric with pipe. The coupling in FIG. 8 is provided with a set of jaws shown by 60 and 62. The movable jaws are held inside the coupling body by means of bolts 73. Preferably jaws are four or more in a set which provide the two outer walls of the coupling to create a cavity for the seal 1. Each jaw is provided with a bolt which moves along with the jaw in the linear radial cut 74. Each jaw is provided an incline depicted by 67, which match the corresponding inner taper provided at the end portions of the coupling body. Before the coupling is mounted over the pipe, the jaws on both sides are pushed inward and are locked in place by squeezing seal 1. The bolts 73 pull the jaws radially outward and expand the diameter of the ends 15 and 15A of seal 1. The expanded diameter of the seal can accommodate the wider tolerances of the large size pipe. Once the coupling is mounted over the plain ends of pipes, the bolts are slackened, and they are hammered outward parallel to the axis of the axis of the pipe, thus moving the jaws inward toward the pipe. When the seal is charged with the fluid the end portions of the seal 15 and 15A are pushed still further outward under the outward pressure of the fluid exerting against the 15 and 15A, thus creating a hydraulic grip around the pipe and keep the pipe from slipping away out of the coupling body.

It is understood that one end of the invented coupling may have a different type of connection, such as a flange connection, a threaded connection, a ring connection, or any other type of jaw connection, to meet different requirements and conditions in making connections with pipes, hoses, pipe and hose fittings, and valves. For dead ends, the coupling is used as a one ended coupling which is provided with a blocking dead end plate. It is further understood that various changes may be made in adapting the invention to different embodiments without departing from the broader inventive concepts disclosed herein and comprehended by the claims that follow.

I claim:

1. A coupling for attachment to the end portion of a pipe, comprising:
   a coupling body to closely receive the end portion of the pipe to be coupled therewith;
   a set of first class lever jaw members each having a power arm and a separate weight arm extending from an axle which forms a fulcrum, said axle having a fulcrum mounting portion extending away from the arms; and
   a mounting hole in the coupling body rotatably receiving the fulcrum mounting portion of each set of lever jaw members therein as the sole mounting of the set of lever jaw members to the coupling body to establish the fulcrum for rotation of each lever jaw member about the fulcrum where rotation of the power arm about the fulcrum causes rotation of the weight arm about the fulcrum to an engaged position or to a disengaged position with respect to the end portion of the pipe when the pipe is received in the coupling body.

2. A coupling for attachment to the end portion of a pipe according to claim 1, wherein the coupling is secured to the end of a pipe to couple to the end of another pipe.

3. A coupling for attachment to the end portion of a pipe according to claim 1, wherein the coupling body includes at least one gasket sealing means for sealing around the end of the pipe to be joined to prevent leakage therefrom.

4. A coupling for attachment to the end portion of a pipe according to claim 3, wherein the end portion of the pipe to be received in the coupling body includes an end, and additionally including a groove in the coupling body for receiving and holding a portion of the at least one gasket and positioned so that the at least one gasket held in the groove contacts the end of the pipe when received in the coupling body.

5. A coupling for attachment to the end portion of a pipe according to claim 3, wherein the end portion of the pipe to be received in the coupling body includes a sloped end portion, and additionally including a groove in the coupling body for receiving and holding a portion of the at least one gasket, the groove having a sloped surface and being positioned so that the sloped surface of the groove is adjacent the sloped end portion to form a continuous sloped surface and the gasket held in the groove contacts the continuous sloped surface.

6. A coupling for attachment to the end portion of a pipe according to claim 3, wherein the gasket is an inverted "U" type seal.

7. A coupling for attachment to the end portion of a pipe according to claim 3, additionally including a groove in the coupling body for receiving and holding a portion of the at least one gasket and positioned so that the gasket held in the groove contacts the end of the pipe when received in the coupling body.

8. A coupling for attachment to the end portion of a pipe according to claim 3, wherein the gasket is a diaphragm seal.

9. A coupling for attachment to the end portion of a pipe, comprising:
   a coupling body to closely receive the end portion of the pipe to be coupled therewith;
   a set of first class lever jaw members each having a power arm and a separate weight arm extending from a fulcrum;
   an axle extending into the coupling body to establish the fulcrum for rotation of each lever jaw member about the fulcrum where rotation of the power arm about the fulcrum causes rotation of the weight arm about the fulcrum to an engaged position or to a disengaged position with respect to the end portion of the pipe when the pipe is received in the coupling body; and
   wherein the weight arm extends from the axle within the coupling body and the power arm extends from the axle outside the coupling body so as to be operable by a user.

10. A coupling for attachment to the end portion of a pipe according to claim 9, wherein the weight arm and the power arm both extend from the axle in approximately the same direction.

11. A coupling for attachment to the end portion of a pipe according to claim 9, wherein the weight arm is offset from the power arm.

12. A coupling for attachment to the end portion of a pipe according to claim 9, wherein the position of each lever jaw member is maintained by friction against movement of the lever jaw members.

13. A coupling for attachment to the end portion of a pipe according to claim 9, wherein the coupling body includes at least one gasket sealing means for sealing around the end of the pipe to be joined to prevent leakage therefrom.

14. A coupling for attachment to the end portion of a pipe according to claim 13, wherein the end portion of the pipe to be received in the coupling body includes an end, and additionally including a groove in the coupling body for receiving and holding a portion of the at least one gasket and positioned so that the at least one gasket held in the groove contacts the end of the pipe when received in the coupling body.

15. A coupling for attachment to the end portion of a pipe according to claim 13, wherein the end portion of the pipe to be received in the coupling body includes a sloped end portion, and additionally including a groove in the coupling body for receiving and holding a portion of the at least one gasket, the groove having a sloped surface and being positioned so that the sloped surface of the groove is adjacent the sloped end portion to form a continuous sloped surface and the gasket held in the groove contacts the continuous sloped surface.

16. A coupling for attachment to the end portion of a pipe according to claim 13, wherein the gasket is an inverted "U" type seal.

17. A coupling for attachment to the end portion of a pipe according to claim 13, additionally including a groove in the coupling body for receiving and holding a portion of the at least one gasket and positioned so that the gasket held in the groove contacts the end of the pipe when received in the coupling body.

18. A coupling for attachment to the end portion of a pipe, comprising:
   a coupling body to closely receive the end portion of the pipe to be coupled therewith;
   a set of first class lever jaw members each having a power arm and a separate weight arm extending from a fulcrum; and
   means mounting each lever jaw member of the set of lever jaw members to the coupling body to establish the fulcrum for rotation of each lever jaw member about the fulcrum where rotation of the power arm about the fulcrum causes rotation of the weight arm about the fulcrum to an engaged position or to a disengaged position with respect to the end portion of the pipe when the pipe is received in the coupling body; and wherein the end portion of the pipe to be received in the coupling body includes an end and a shoulder facing away form the end, wherein the coupling body extends over the shoulder when the end portion of the pipe is inserted into the coupling body, whereby the weight arms of the lever jaw members engage the shoulder to secure the coupling to the pipe end portion when in engaged position.

19. A coupling for attachment to the end portion of a pipe according to claim 18, wherein the means mounting each lever jaw member and establishing the fulcrum is an axle extending to into the coupling body.

20. A coupling for attachment to the end portion of a pipe according to claim 18, wherein the shoulder is formed by a groove in the end portion of the pipe.

21. A coupling for attachment to the end portion of a pipe according to claim 1, wherein the coupling joins two pipes in end to end relationship, each pipe having an end portion, wherein the coupling body is adapted to closely receive the end portion of each of the two pipes to be joined in end to end relationship, the set of lever jaw members being located with respect to the coupling body to engage the end portion of one of the two pipes to be joined, the coupling further including a second set of first class lever jaw members each having a power arm and a separate weight arm extending from an axle which forms a fulcrum, said axle having a fulcrum mounting portion extending away from the arms, a mounting hole in the coupling body rotatable receiving the fulcrum mounting portion of each set of lever jaw member of the second set of lever jaw members therein as the sole mounting to the coupling body to establish the fulcrum for rotation of each lever jaw member of the second set of lever jaw members about the fulcrum where rotation of the power arm about the fulcrum causes rotation of the weight arm about the fulcrum to an engaged position or to a disengaged position with respect to the end portion of the other pipe when received in the coupling body, the second set of lever jaw members being spaced from the set of lever jaw members and located with respect to the coupling body to engage the end portion of the other of the two pipes to be joined when the other pipe is received in the coupling body and the lever jaws of the second set of lever jaw members are rotated to an engaged position, and to disengage the end portion of such other of the two pipes when the lever jaws of the second set of lever jaw members rotate to a disengaged position.

22. A coupling for attachment to the end portion of a pipe according to claim 21, wherein the coupling body includes at least one gasket sealing means for sealing around the ends of the pipes to be joined to prevent leakage therefrom.

23. A coupling for joining two pipes in end to end relationship each pipe having an end portion and a shoulder in the end portion of the pipe wherein the coupling body is adapted to closely receive the end portion of each of the two pipes to be joined in end to end relationship, comprising:
a coupling body to closely receive the end portions of each of the two pipes to be joined in end to end relationship;
a first set of first class lever jaw members each having a power arm and a separate weight arm extending from a fulcrum;
means mounting each lever jaw member of the first set of lever jaw members to the coupling body to establish the fulcrum for rotation of each lever jaw member of the first set of lever jaw members about the fulcrum where rotation of the power arm about the fulcrum causes rotation of the weight arm about the fulcrum to an engaged position or to a disengaged position with respect to the end portion of the pipe when the pipe is received in the coupling body;
a second set of first class lever jaw members each having a power arm and a separate weight arm extending from a fulcrum;
means mounting each lever jaw member of the second set of lever jaw members to the coupling body to establish the fulcrum for rotation of each lever jaw member of the second set of lever jaw members about the fulcrum where rotation of the power arm about the fulcrum causes rotation of the weight arm about the fulcrum to an engaged position or to a disengaged position with respect to the end portion of the pipe when the pipe is received in the coupling body; and
wherein the coupling body is substantially cylindrical and of a length to extend over the circumferential shoulder of the one pipe of two pipes to be joined end-to-end and over the shoulder of the other of the two pipes to be joined, wherein the set of lever jaws is located at one end of the body and the second set of lever jaws is located at the other end of the body.

24. A coupling for attachment to the end portion of a pipe according to claim 23, wherein the means mounting each lever jaw member and each second lever jaw member and establishing the fulcrum is an axle extending into the coupling body.

25. A coupling for attachment to the end portion of a pipe according to claim 23, wherein the coupling body includes at least one gasket sealing means for sealing around the ends of the pipes to be joined to prevent leakage therefrom.

26. A coupling for, joining two pipes in end to end relationship, each pipe having an end portion, wherein the coupling body is adapted to closely receive the end portion of each of the two pipes to be joined in end to end relationship, comprising:
a coupling body to closely receive the end portions of each of the two pipes to be joined in end to end relationship;
a first set of first class lever jaw members each having a power arm and a separate weight arm extending from a fulcrum;
an axle extending into the coupling body to establish the fulcrum for rotation of each lever jaw member of the first set of lever jaw members about the fulcrum where rotation of the power arm about the fulcrum causes rotation of the weight arm about the fulcrum to an engaged position or to a disengaged position with respect to the end portion of one of the two pipes to be joined when the end portion of the one of two pipes to be joined is received in the coupling body;
a second set of first class lever jaw members each having a power arm and a separate weight arm extending from a fulcrum;
an axle extending into the coupling body to establish the fulcrum for rotation of each lever jaw member of the second set of lever jaw members about the fulcrum where rotation of the power arm about the fulcrum causes rotation of the weight arm about the fulcrum to an engaged position or to a disengaged position with respect to the other end portion of the pipe when the other end portion of the pipe is received in the coupling body;
wherein the respective weight arms extend from the axle within the coupling body and the respective power arms extend from the axle outside the coupling body so as to be operable by a user.

27. A coupling for attachment to the end portion of a pipe according to claim 1, wherein the coupling joins two pipes in end to end relationship, each pipe having an end portion and a shoulder in the end portion of the pipe, wherein the coupling body is adapted to closely receive the end portion of each of the two pipes to be joined in end to end relationship, the set of lever jaw members being located with respect to the coupling body to engage the shoulder in the end portion of one of the two pipes to be joined, the coupling further including a second set of first class lever jaw members each having a power arm and a separate weight arm extending from an axle which forms a fulcrum, said axle having a fulcrum mounting portion extending away from the arms, a mounting hole in the coupling body rotatably receiving the fulcrum mounting portion of each set of lever jaw member of the second set of lever jaw members therein as the sole mounting to the coupling body to establish the fulcrum for rotation of each lever jaw member of the second set of lever jaw members about the fulcrum where rotation of the power arm about the fulcrum causes rotation of the weight arm about the fulcrum to an engaged position or to a disengaged position with respect to the end portion of the other pipe when received in the coupling body, the second set of lever jaw members being spaced from the set of lever jaw members and located with respect to the coupling body to engage the shoulder in the end portion of the other of the two pipes to be joined when the other pipe is received in the coupling body and the lever jaws of the second set of lever jaw members are rotated to an engaged position, and to disengage the groove of such other of the two pipes when the lever jaws of the second set of lever jaw members rotate to a disengaged position.

* * * * *